United States Patent [19]

Rowland et al.

[11] Patent Number: 5,326,828
[45] Date of Patent: Jul. 5, 1994

[54] TETRABENZYLTHIURAM DISULFIDE/UREA CURED ELASTOMERIC COMPOSITION

[75] Inventors: Donald G. Rowland, Woodbridge; David T. Faiman; Thomas L. Jablonowski, both of Naugatuck, all of Conn.

[73] Assignee: Uniroyal Chemical Company, Inc., Middlebury, Conn.

[21] Appl. No.: 959,507

[22] Filed: Oct. 9, 1992

Related U.S. Application Data

[63] Continuation of Ser. No. 595,156, Oct. 10, 1990, abandoned.

[51] Int. Cl.$^5$ .................... C08C 19/20; C08C 19/22
[52] U.S. Cl. .................... 525/346; 525/349; 525/352
[58] Field of Search ............... 525/346, 352

[56] References Cited

FOREIGN PATENT DOCUMENTS 283552 9/1988 European Pat. Off. ....... C08K 5/40
387454 2/1933 United Kingdom .

OTHER PUBLICATIONS

Perkacit DP-TB$_2$TD ... A Contribution to solve the Nitroamine problem, AKZO.

Primary Examiner—Christopher Henderson
Attorney, Agent, or Firm—Jerome D. Drabiak

[57] ABSTRACT

The current invention relates to the use of tetrabenzylthiuram disulfide/urea curative package for thermosetting rubber elastomers in an environmentally sound method of eliminating undesirable nitrosamines. The unique curative package synergistically increases the cure rate and physical properties of the elastomeric compound while reducing the amount of accelerator needed for vulcanization.

5 Claims, No Drawings

TETRABENZYLTHIURAM DISULFIDE/UREA CURED ELASTOMERIC COMPOSITION

This is a continuation of application Ser. No. 07/595,156 filed Oct. 10, 1990, now abandoned.

BACKGROUND OF THE INVENTION

The current invention relates to the use of tetrabenzylthiuram disulfide/urea curative package for curing elastomers in an environmentally safe method of eliminating undesirable nitrosamines. The unique curative package synergistically increases the cure rate of the tetrabenzylthiuram disulfide accelerator while reducing the amount of accelerator needed for vulcanization.

Vulcanization may be defined as a reaction in the presence of heat where a chemical additive reacts with an elastomer to change it from a plastic, tacky solid to a thermoset, fixed solid with improved strength and elasticity, and increased hardness. The vulcanization reaction is one in which the polymeric rubber molecules are cross-linked by the vulcanizing agent to form a network of macromolecules having less mobility and which have the desired physical properties of a usable rubber product. The type of crosslinking (or vulcanizing) agent will vary with the type of rubber used and the properties desired.

The most commonly used vulcanizing agent is sulfur, as it enters into reactions with the majority of the unsaturated rubbers to produce vulcanizates. Sulfur, in the presence of heat, reacts with adjoining olefinic bonds in the polymeric backbone chains or in pendant chains of two elastomeric molecules to form cross-links between the molecular chains.

Vulcanization, as originally known, required long hours and elevated temperatures. Progress was made in speeding the process and improving the properties of the vulcanized product by using accelerators. Reduction in the time required for vulcanization is generally accomplished by changes in the amounts and types of accelerators used.

An accelerator can be defined as a material which, when added to rubber, will materially reduce the time and temperature necessary to effect vulcanization of rubber with sulfur. Organic accelerators are divided into certain chemical groups, and can be classified as either primary or secondary accelerators based on the compound' activity in elastomeric compounds.

Thiazoles and sulfenamides are known to yield a classical curemeter vulcanization curve with adequate scorch time and are known as primary accelerators. Thiurams, dithiocarbamates, aldehyde amines and guanidines are classified as secondary accelerators. It is usual practice for primary and secondary accelerators to be used in combination.

Activators are compounds which render accelerators more potent. Examples of commonly used activators include zinc oxide used with stearic acid and zinc salts of lauric and related fatty acids used with thiazoles, thiurams, and dithiocarbamates. Other examples of activators include the action of guanidines or aldehydeamines with the thiazoles and the action of aromatic amines with xanthogen disulfides.

The compounds which are the subject of this invention include an improvement to the class of accelerators known as thiuram disulfides. Thiuram disulfides constitute a major class of accelerator which are intermediate in activity between the dithiocarbamates and thiazoles. They are less heat sensitive than the former and are readily processable under standard manufacturing conditions.

Thiuram disulfide accelerators are fast, strong, nondiscoloring, and give vulcanized stocks having high tensile strengths, low set and high resilience. They function well in the presence of carbon blacks, acidic fillers, or softeners.

Two of the thiuram disulfides in common use are tetramethylthiuram disulfide(TMTDS) and tetraethylthiuram disulfide(TETDS). These accelerators may be used either as primary or secondary accelerators and are especially useful as secondary accelerators with thiazoles as primary accelerators. Recent concerns over certain nitrosamines has created an incentive to minimize their presence in the workplace. Nitrosamines are formed during vulcanization when the amines generated directly or indirectly from these accelerators combine with nitrogen oxides present in the atmosphere. It is postulated, given the basic structure of the thiuram disulfide accelerators, that decomposition and subsequent reaction with nitrogen oxides present in air (NOx) form nitrosamines of the general formula $O=N-NR_2$, where R is the tetra substituted moiety on the thiuram disulfide.

The challenge is to retain the advantages of the thiuram disulfide accelerators while eliminating the generation of certain undesirable N-nitrosamines. The accelerator of this invention, known as tetrabenzyl thiuram disulfide, meets that challenge only when combined with urea and sulfur in a unique curative package. Toxicologic studies of this experimental accelerator have shown that dibenzyl nitrosamine (DBNA) that may be formed during a vulcanization side reaction as indicated above is non-carcinogenic, is present in very small amounts, and that an increase in its concentration following vulcanization is not observed. This accelerator, tetrabenzylthiuram disulfide (TBTDS) which can be made by, for example, the process given in U.S. Pat. No. 4,459,424, example 37, and by a general process for the preparation of thiuram disulfides contained therein and in U.S. Pat. No. 4,468,526 has been found to have some processing drawbacks and is not a direct replacement for the commonly used tetraalkyl thiuram disulfides described above. When tetramethyl thiuram disulfide is replaced on a part-to-part basis by TBTDS in rubber compounds, some of the physical properties of the cured elastomers are not as satisfactory as those obtained with tetramethyl thiuram disulfide.

An object of this invention is to reduce the time for curing tetrabenzylthiuram disulfide while imparting excellent physical properties to the cured elastomer. A still further object of this invention is to provide a process for curing elastomers which will not generate any potentially dangerous nitrosamines into the workplace.

SUMMARY OF THE INVENTION

The objects and advantages of the instant invention may be obtained using a thermosettable elastomeric composition having the following principal ingredients:

a) 100 parts by weight of a thermosettable, unsaturated rubbery polymer;
b) 5 to 1000 parts of a particulate filler;
c) 0.05 to 10 parts of sulfur;
d) 0.02 to 3.0 parts of tetrabenzylthiuram disulfide;
e) 0.02 to 6.0 parts of urea,
wherein the ratio of d) to e) is from about 1:10 to about 10:1, all parts by weight per hundred parts by weight of a). Another aspect of the invention relates to a method of eliminating the spontaneous generation of nitrosamine compounds in a vulcanization process for the curing of thermosetting elastomer compositions comprising:

mixing a thermosettable elastomeric composition essentially as set forth above with the limitation that the curing package consists only of: a) 0.05 to 10 parts of sulfur; b) 0.02 to 3.0 parts of tetrabenzylthiuram disulfide; and c) 0.02 to 6.0 parts of urea, wherein the ratio of b) to c) is from about 1:10 to about 10:1, all parts by weight per hundred parts by weight of a);and curing said elastomeric composition with heat and optionally pressure for a time sufficient to cure said composition. Of course the mixed composition may also include other components so long as those components do not generate lower alkyl N-nitrosamines.

DETAILED DESCRIPTION OF THE INVENTION

Surface-treated urea has been used for activating blowing agents and accelerators. "Rubber Chemicals", J. Van Alphen (1973) lists modified urea in an activator subgroup and includes several trademarked ureas, including BIK-OT, a trademark of Uniroyal Chemical Company, Inc.

Another general reference to urea as an activator is found in the 1990 Rubber Blue Book (Lippincott & Peto, Akron, Ohio, U.S.A.), which indicates that this compound can be used as an activator for nitrogen-type blowing agents as well as for thiazole, thiuram and dithiocarbamate accelerators in chloroprene, isobutylene-isoprene, nitrile-butadiene, isoprene (natural), and styrene-butadiene rubbers. Advantages of using urea in these applications include reducing odor-producing properties of dinitroso pentamethylene tetramine blowing agents. Another advantage is lowering the decomposition point of azodicarbonamide blowing agents to a range amenable for rubber curing and blowing. This reference contains no suggestion that the urea could be synergistically more activating with the tetrabenzylthiuram disulfide than with the tetraalkylthiuram disulfides. This result was unexpected and surprising.

An example of urea used in rubber compounding in the 1968 edition of the Vanderbilt Rubber Handbook, pages 87-8 uses cis-polyisoprene, sulfur, a sulfenamide accelerator and urea(BIK) in a hard clay compound. There is no suggestion of its use with thiurams. It is noted here that the term "phr" is used hereinafter as the abbreviation for parts by weight per hundred parts of rubber hydrocarbon, as is in common practice and use in the rubber industry.

The activator/accelerator systems of this invention are most advantageously utilized in the vulcanization of highly unsaturated polymers such as natural or synthetic elastomers. These polymers will also be referred to as thermosettable to denote sulfur curable and as rubbery to distinguish from plastic polymeric materials. These terms may also be used together. Representative of the highly unsaturated polymers that may be employed in the practice of this invention include natural rubber, cis-polyisoprene, polybutadiene, poly(styrene-butadiene), polychloroprene, and poly(acrylonitrile-butadiene), as well as latices thereof. Moreover, mixtures of two or more highly unsaturated rubbers may be employed. Also, mixtures of the highly unsaturated rubbers with elastomers having lesser unsaturation such as ethylene-propylenediene rubber (EPDM), ethylene-propylene rubber (EPR), butyl or halogenated butyl rubbers are also within the contemplation of this invention.

The highly unsaturated polymers to be protected may be formulated in the conventional manner with the many usual compounding ingredients including vulcanizing agents, antidegradants, plasticizing oils, softeners, fillers, reinforcing pigments, and carbon blacks. The term "particulate filler" encompasses any of the last three categories as well as coloring pigments and may be present cumulatively from as little as 1 phr to 1000 phr. The term- cure activator- describes the group of materials recognized to assist curative efficiency such as stearic acid, oleic acid, lauric acid, zinc oxide, and zinc stearate or laurate. The 1990 Rubber Blue Book is incorporated by reference to provide detail of the compounding ingredients.

The first critical component of the cure system of this invention is tetrabenzylthiuram disulfide, present from about 0.02 to about 3.0 parts, more preferably 0.1 to 1.5 and most preferably, 0.25 to 1.0.

The second critical cure component is urea which is used at levels between 0.02 to about 6.0 phr, more preferably 0.5 to 2.0 and most preferably 1.0 to 1.5 phr. The TBTDS to urea ratio may range between 1:10 to 10:1, more preferably 1:8 to 3:1. It is strongly preferred to favor higher levels of urea; therefore, ratios of 1:1 to 1:6 are preferred and 1:2 to 1:6 is most preferred.

The third critical cure compound is sulfur, preferably in elemental form such as the commonly used rhombic crystalline form called rubber makers' sulfur or spider sulfur. It is present at from about 0.05 to 10 phr, preferably 0.25 to 2.5 and most preferably 0.5 to 2.0.

An optional additional cure component is a secondary cure accelerator which may be helpful for specific polymers and/or processing requirements. This additional accelerator may be chosen from among the following classes:

1. Thiazoles, representative materials are
   benzothiazyl disulfide, 2-mercaptobenzothiazole and its metal salts(ie. Zn).
2. Sulfenamides—representative materials are
   N-oxydiethylene benzothiazole-2-sulfenamide and N-cyclohexyl-2-benzothiazolesulfenamide.
   N-Isopropylbenzothiazole sulfenamide
   N,N'-diisopropylbenzothiazole sulfenamide
   N-t-butyl-2-benzothiazole sulfenamide

PREFERRED EMBODIMENTS

Table 1 shows the amounts of the various accelerators and activators used to determine the optimum levels and combinations thereof for use in EPDM rubber. The following is the formulation that was used for this series of optimizations:

| EPDM TEST FORMULATION | |
|---|---|
| | (Parts by Weight) (phr) |
| EPDM (Royalene X-3180) | 50 |
| EPDM (Royalene 512) | 50 |
| Carbon Black (N-650) | 125 |
| Processing Oil | 95 |
| Zinc Oxide | 5 |
| Stearic Acid | 1 |

Note: Royalene is a registered trademark of Uniroyal Chemical Company, Inc.

The formulation is an approximation of a typical EPDM roofing compound, and is used in further compounding as Masterbatch 1 (MB1). The standard vulcanizing ingredients as well as the variables (types and amounts of accelerators and activators) will be disclosed in the subsequent examples.

The formulations were compounded as follows: a masterbatch containing the polymers, fillers, zinc oxide and stearic acid were combined in a 1A Banbury mixer at #2 speed with the water turned off and the rotors preheated with steam. All ingredients were added initially (time0). The ram was swept at 220° F and the batch was discharged at 250° F., at which time the primary and secondary accelerators, activators, and sulfur were added on a 10 inch laboratory mill for a 5 minute mixing cycle.

The formulations were tested for curemeter properties, each formulation having equal levels of MB1 (326 phr), equal levels of sulfur,(0.7 phr) primary accelerator (N-t-butyl-2-benzothiazolesulfenamide, Delac NS TM (2 phr), and secondary accelerator (benzothiazyl disulfide(MBTS TM ) (0.3 phr).

The curing characteristics of the samples were investigated using a Monsanto ODR 2000 Rheometer and ASTM Method D2084-81. The curing rate is measured by the rapidity with which the physical properties of the rubber compound develops with time of heating. The method used to determine the curing rate is to use a curemeter to obtain a torque versus time curve. Optimum cure is generally considered as the time required to attain 90% of full torque or modulus development.

The curing characteristics are reported as TS1, the time necessary for a one point increase in torque, T90, the time necessary for 90% cure to take place, both in minutes. The maximum torque(MH), representing the overall state of cure, is reported in lb-in.

In addition, the tensile and stress/strain properties of the unaged samples are presented. These tests were run by ASTM methods D573-81 and D412-83, and are reported in psi.

TABLE 1

| Constituents, in parts by weight | Sample No. | | | |
|---|---|---|---|---|
| | 1 | 2 | 3 | 4 |
| MB-1 | 326 | 326 | 326 | 326 |
| Delac NS | 2 | 2 | 2 | 2 |
| TMTDS | 0.5 | | | |
| TETDS | 0.5 | | | |
| TBTDS | | 1 | 0.5 | 0.25 |
| urea | | | 1.25 | 1.5 |
| MBTS | 0.3 | 0.3 | 0.3 | 0.3 |
| SULFUR | 0.7 | 0.7 | 0.7 | 0.7 |
| RHEOMETER DATA 24' @ 320° F. | | | | |
| MH, lb-in | 21.2 | 20.9 | 20.5 | 19.8 |
| Tsl, min | 7.3 | 8.3 | 7.2 | 7.5 |
| T90, min | 14.2 | 16.4 | 15.1 | 15.7 |
| PHYSICAL PROPERTIES Cured at 320° F. (180° C.) | | | | |
| 300% Modulus, psi | 670 | 670 | 610 | 520 |
| Tensile Str, psi | 1620 | 1580 | 1500 | 1450 |
| Elongation, % at break | 780 | 780 | 840 | 830 |
| Hardness, Shore A | 59 | 61 | 61 | 59 |

One of the unexpected results of this invention is the reduced amount of non-hazardous nitrosamine generating accelerator necessary to induce cure when activated by urea. It is therefore noteworthy that the optimum level of TBTDS is as low as 0.25 phr when activated by urea, as compared to 1.0 phr of the tetraalkyl thiuram disulfides currently in use.

Further comparisons and evidence of the unique activity of urea as an activator for TBTDS are presented in Table II. Again using the masterbatch 1 and the processing details above, the variables were the amounts of the thiuram accelerators and urea. The amount of masterbatch 1 used throughout was 326 phr. The primary accelerator, N-t-butyl-2-benzothiazolesulfenamide, was used throughout and held constant at 2 phr. Sulfur was used as the vulcanizing agent and added at 0.7 phr in each example.

In the first set of examples, the variable was the amount of TMTDS, TETDS, and TBTDS used. The amount used was 1 phr of each with no urea added as activator:

TABLE II

| | Sample Number | | |
|---|---|---|---|
| | A | B | C |
| TMTDS | 1 | — | — |
| TETDS | — | 1 | — |
| TBTDS | — | — | 1 |
| Rheometer Data 24 minutes @ 320° F.: | | | |
| MH, lb-in | 22.4 | 21.9 | 21.2 |
| Tsl, min. | 6.9 | 7.9 | 8.5 |
| Tc90, min. | 14.3 | 15.6 | 16.9 |

In the second set of examples, the amount of each thiuram disulfide was halved, to a level of 0.5 phr each, with no activator. The rheometer data for these samples follow:

| | Sample Number | | |
|---|---|---|---|
| | D | E | F |
| TMTDS | 0.5 | — | — |
| TETDS | — | 0.5 | — |
| TBTDS | — | — | 0.5 |
| Rheometer Data 24 minutes @ 320° F.: | | | |
| MH, lb-in | 21.3 | 21.1 | 19.9 |
| Tsl, min. | 7.9 | 8.6 | 9.6 |
| Tc90, min. | 16.9 | 17.4 | 18.9 |

In the third set of examples, the levels of thiuram disulfide accelerators indicated above (0.5 phr) are used and 1.5 phr of urea (activator) is added. The rheological data for these samples is now presented:

| | Sample Number | | |
|---|---|---|---|
| | G | H | I |
| TMTDS | 0.5 | — | — |
| TETDS | — | 0.5 | — |
| TBTDS | — | — | 0.5 |
| Urea | 1.5 | 1.5 | 1.5 |
| Rheometer Data 24 minutes @ 320° F.: | | | |
| MH, lb-in | 21.4 | 20.8 | 20.9 |
| Tsl, min. | 6.3 | 6.6 | 7.0 |
| Tc90, min. | 14.9 | 14.7 | 15.6 |

These data show that TBTDS is slower on a part-for-part basis than the tetraalkyl thiuram disulfides at all levels. Samples A–C, and D–F indicate that TBTDS, unactivated, has a Ts1 as much as 23% longer than the industry standard tetraalkyl thiuram disulfide accelerator, unactivated.

Samples G–I indicate the comparative differences when a) the amount of accelerator is held at 0.5 phr and b) the accelerator in each example is activated by 1.5 phr of urea. The difference between the MH values for TMTDS and TBTDS, representing the maximum state of cure of the samples, has been reduced to less than 2%. The difference in Ts1 for TBTDS, representing the time necessary for a 1 point torque rise, is within 11% of the industry standard tetraalkyl thiuram disulfide accelerators. Tc90, representing the time needed for 90% cure, is only 4% higher for TBTDS than for the standards.

It can also be seen from the above data that the efficiency of TBTDS as an accelerator can be significantly improved by the addition of urea. It is further concluded that the improvement in activation for TBTDS by urea is greater than the improvement for the tetraalkyl thiuram disulfides on a part-for-part basis, which is markedly unexpected. Further documentation of this statement is shown in Table V below.

This result is in accordance with the object of this invention which seeks a practical, efficient and cost-effective method to vulcanize elastomers without the generation of possibly harmful nitrosamines.

Further evidence of the efficacy of urea as an activator for TBTDS, rendering it practical and efficient for safely curing elastomers is seen when it was incorporated into a formulation using natural rubber.

The following natural rubber formulation was compounded in a manner similar to the procedure given above for the EPDM formulations. It is a standard natural rubber formulation.

| NATURAL RUBBER TEST FORMULATION | |
| --- | --- |
| | (phr) |
| Natural Rubber (SMR 5CV) | 100 |
| Carbon Black (N660) | 50 |
| Processing Oil (Circosol 4240) | 12 |
| Zinc Oxide | 3 |
| Stearic Acid | 1 |

This formulation is used in further compounding and will be referred to as Masterbatch 2 (MB2), which was present in 166 phr in the following formulations. Each formulation had equal levels of sulfur (2.5 Phr), primary accelerator, Benzothiazyl disulfide(MBTS_TM)(0.5 phr). The variables were the concentrations of thiuram disulfide accelerators and urea (activator).

The formulations and rheological and physical test results are described below. (Note: The compounding procedures used for these formulations are similar to those given for the EPDM examples in Table I.

TABLE III

| | Sample No. | | | |
| --- | --- | --- | --- | --- |
| Constituents, in parts by weight | 5 | 6 | 7 | 8 |
| MB-2 | 166 | 166 | 166 | 166 |
| Sulfur | 2.5 | 2.5 | 2.5 | 2.5 |
| MBTS | 0.5 | 0.5 | 0.5 | 0.5 |
| TMTDS | 0.5 | — | — | — |
| TBTDS | — | 0.5 | 0.25 | 0.375 |
| Urea | — | — | 1.5 | 1.5 |
| RHEOMETER DATA 160° C., 1°, 100 CPM | | | | |
| MH, lb-in | 28.4 | 21.7 | 28.5 | 28.5 |
| Ts1, min | 2.5 | 2.8 | 2.4 | 2.4 |
| Tc90, min | 3.6 | 4.7 | 3.9 | 3.6 |
| PHYSICAL PROPERTIES CURED 5'/160° C. | | | | |
| 300% Modulus, psi | 1350 | 920 | 1350 | 1510 |
| Tensile Str, psi | 2780 | 2690 | 2720 | 2900 |
| Elongation, % at break | 490 | 550 | 470 | 470 |

TABLE III-continued

| | Sample No. | | | |
| --- | --- | --- | --- | --- |
| Constituents, in parts by weight | 5 | 6 | 7 | 8 |
| Hardness, Shore A | 60 | 53 | 59 | 61 |

It is noted from the data from Table II that the samples compounded with TBTDS and no activator do not compare satisfactorily with the TMTDS standard tetraalkyl accelerators. However, when the TBTDS accelerator is activated with urea, the results as seen above are comparable with the industry standards regarding both rheologic and physical Properties.

Also noteworthy and in line with one of the objects of the current invention is that the level of TBTDS accelerator needed to Produce satisfactory performance is greatly reduced when the accelerator is activated by urea. As evidenced by sample 7 above, the amount of TBTDS required is as low as 0.25 phr, which represents a 50% reduction in the amount of accelerator needed, as compared with the commonly used industry standard of 0.5 phr.

A set of samples using styrene/butadiene rubber (SBR) as the basis was formulated and tested to further explore the unexpected and novel properties we have found for both EPDM and natural rubber.

The following ingredients were mixed in a #1A Banbury at speed #1 with the water on at time =0:

| SBR TEST FORMULATION | |
| --- | --- |
| | (phr) |
| Styrene/Butadiene Rubber (SBR 1502) | 100 |
| Carbon Black (N660) | 60 |
| Processing Oil (Circosol 4240) | 10 |
| Zinc Oxide | 5 |
| Stearic Acid | 2 |
| Antioxdant* | 1 |

*(polymerized trimethyl dihydroquinoline)

This formulation is used in further compounding and will be referred to as Masterbatch 3 (MB3). The SBR formulations were tested for both rheological and physical properties. Each formulation had equal levels of sulfur (2 phr) and benzothiazyl disulfide accelerator (1 phr). The variables were the concentrations of the thiuram disulfide accelerators and urea(activator).

The formulations and test data are presented in Table IV. (Note: The compounding procedures used for these are similar to those described from EPDM and natural rubber).

TABLE IV

| | Sample No. | | |
| --- | --- | --- | --- |
| Constituents, in parts by weight | 9 | 10 | 11 |
| MB-3 | 178 | 178 | 178 |
| Sulfur | 2 | 2 | 2 |
| MBTS | 1 | 1 | 1 |
| TMTDS | 0.5 | — | — |
| TBTDS | — | 0.5 | 0.1 |
| Urea | — | — | 0.4 |
| RHEOMETER DATA 24 minutes, 160° C., 1° arc, 100 cpm | | | |
| MH, lb-in | 44.3 | 36.8* | 38.1 |
| Ts1, min | 3.0 | 4.1 | 3.45 |
| Tc90, min | 10.65 | 17.55 | 10.6 |
| PHYSICAL PROPERTIES Cured for 20 minutes, 160° C. | | | |
| 200% modulus, psi | 1380 | 1110 | 1250 |
| Tensile Str, psi | 1990 | 2130 | 1810 |
| Elongation, | 240 | 360 | 250 |

TABLE IV-continued

| Constituents, in parts by weight | Sample No. | | |
|---|---|---|---|
| | 9 | 10 | 11 |
| % at break | | | |
| Hardness, Shore A | 72 | 67 | 70 |

(Note for table IV: *the MH value for sample 10 was still increasing at 24 minutes of rheometer testing)

The data presented in Table IV shows clearly that the amount of TBTDS accelerator necessary for vulcanization, when activated by urea, can be reduced to 0.1 phr. This represents an 80% reduction in the amount of accelerator used as compared to the 0.5 phr of TMTDS used to produce the same degree of cure. Using the urea activator with only 20% of TBTDS resulted in physical properties which equalled the properties of the industry standard, TMTDS.

The formulations and test data presented in Table V is additional evidence as to the efficacy of urea in activating TBTDS to practical utility in curing rubber. The data further shows that the effect of urea on TBTDS is greater than its effect on TMTDS, a standard industry accelerator.

The elastomer used for these additional comparative examples is Masterbatch #3, the SBR formulation depicted in Table IV. In the following samples, MB#3 is present in 178 phr, sulfur at 2 phr, and MBTS (primary accelerator) is present in 1 phr. The variables that follow are the amount of each thiuram accelerator and the presence or absence of urea as activator.

TABLE V

| | Sample Number | | |
|---|---|---|---|
| | J | K | L |
| TMTDS | 0.5 | — | — |
| TETDS | — | 0.5 | — |
| TBTDS | — | — | 0.5 |
| Rheometer Data 24 minutes at 160° C., 1° arc | | | |
| MH, lb-in | 45.6 | 42.6 | 37.0 |
| Tsl, min | 3.5 | 3.95 | 4.45 |
| Tc90, min | 11.7 | 13.2 | 17.6 |

In the second set of examples, the same amounts of thiuram accelerators were used and 1.5 phr of urea was added. The Rheometer data follows. (Note: The conditions for the rheometric tests are the same throughout this set of experiments.)

| | Sample Number | | |
|---|---|---|---|
| | M | N | O |
| TMTDS | 0.5 | — | — |
| TETDS | — | 0.5 | — |
| TBTDS | — | — | 0.5 |
| urea | 1.5 | 1.5 | 1.5 |
| Rheometer Data | | | |
| MH, lb-in. | 33.5 | 33.1 | 32.0 |
| Tsl, min | 2.85 | 3.25 | 3.5 |
| Tc90, min | 4.55 | 5.3 | 6.0 |

When comparing the Ts1 and Tc90 values for these samples with 0.5 phr thiuram disulfide accelerator with and without the urea activator, the differences are in the same magnitude; for example, the percent differences in $T_c 90$ samples M/J, N/K, and O/L are −61.1, −59.8, and −65.4 respectively. When the amount of thiuram disulfide accelerator is reduced, however, a large difference in magnitude of these properties result:

| | Sample Number | | |
|---|---|---|---|
| | P | Q | R |
| TMTDS | 0.1 | — | — |
| TETDS | — | 0.1 | — |
| TBTDS | — | — | 0.1 |
| urea | 0.4 | 0.4 | 0.4 |
| Rheological Data | | | |
| MH, lb-in | 38.1 | 37.6 | 36.9 |
| Tsl, min | 3.9 | 4.1 | 4.2 |
| Tc90, min | 10.25 | 10.6 | 11.55 |

For these samples with reduced amount of accelerator, a larger comparative difference between the activation of TBTDS by urea than by the urea activation of TMTDS or TETDS is seen. For example, we see a 12.4% drop in Tc90 when we compare samples P and J; a 19.7% drop is seen from samples Q and K; and a 34.4% drop in Tc90 is seen between samples R and L.

These data show that surface treated urea is a more efficient activator for the less-hazardous TBTDS accelerator, than other thiurams. Furthermore, the activator improves the activity of the TBTDS accelerator to a level comparable to the industry standard tetraalkyl thiuram disulfide accelerators. It further shows that the improvement in activation and the reduction in quantity of accelerator needed is much more strongly demonstrated in the tetrabenzyl thiuram disulfide accelerator than the lower alkyl thiuram disulfides. The above data also proves that their use in curing elastomers imparts excellent physical properties when cured.

Many rubber articles can benefit from the characteristics of the urea/tetrabenzylthiuram disulfide curing system. These may include tires, hose, belts, air springs, gaskets, bushings, motor mounts, window seals, weatherstripping, bridge bearing pads, rubber roofing membranes, geophysical membranes such as pond liners, shoe soles and heels, expansion joints, vibration joints, oil field Parts and many other rubber articles.

In view of the many changes and modifications that may be made without departing from principles underlying the invention, reference should be made to the appended claims for an understanding of the scope of the protection afforded the invention.

We claim:

1. In a vulcanization process, the improvement which comprises combining with a thermosettable elastomeric composition a cure system consisting essentially of from about 0.02 to about 3.0 parts tetrabenzylthiuram disulfide, between 0.02 to about 6.0 phr urea and about 0.05 to 10 phr sulfur, each such cure system ingredient being present in an amount effect not only for enabling the thermosettable composition to cure to preselected physical property ranges but also for reducing to lesser-than-conventional levels the amount of nitrosamine generated upon curing.

2. The process of claim 1 wherein a cure component selected from a thiazole, a sulfenamide, or both is additionally combined with both the thermosettable elastomeric composition and the cure system.

3. The process of claim 1 further including the additional step of curing the thermosettable elastomeric composition.

4. The process of claim 1 further comprising the steps of curing the thermosettable elastomeric composition and shaping said elastomeric composition into the form of a rubber article before, after or simultaneously with said curing step.

5. The process of claim 1 wherein said tetrabenzylthiuram disulfide is present at between 0.1 and 1.0 parts by weight and urea is present at between 0.5 and 2.0 parts at a ratio of tetrabenzylthiuram disulfide to urea of 1:2 to 1:4.

* * * * *